Jan. 9, 1968   J. L. MOSSEY   3,362,506
BRAKE
Filed Jan. 10, 1964   3 Sheets-Sheet 3
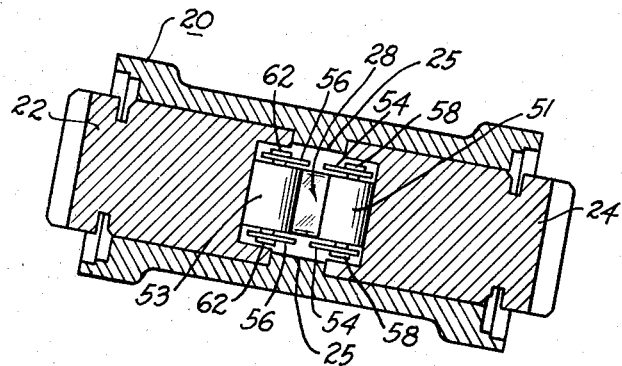
FIG_4
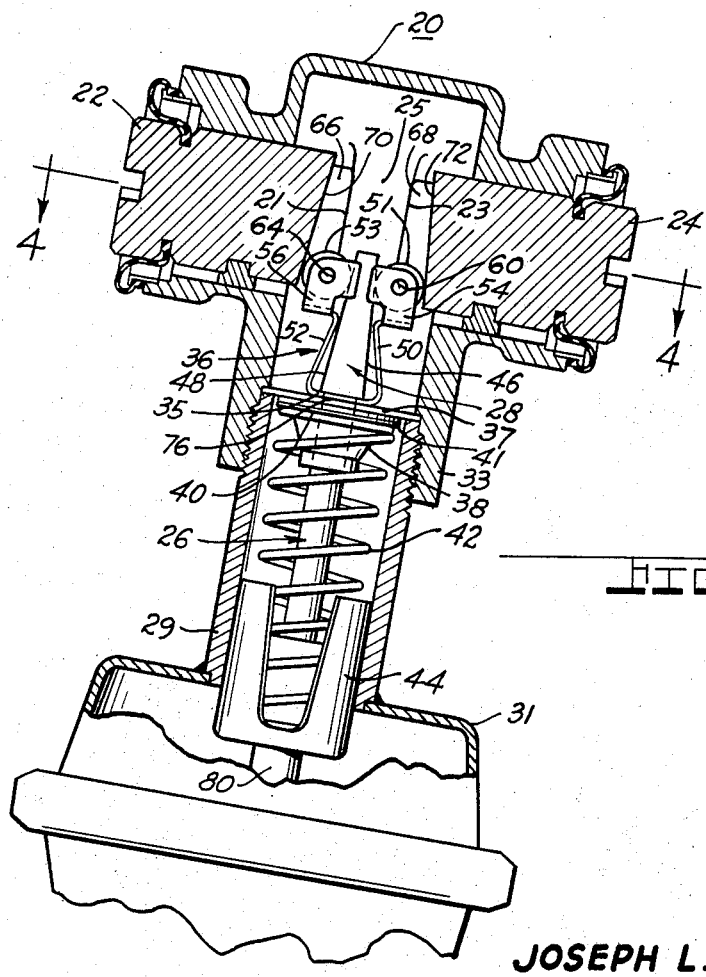
FIG_3
INVENTOR.
JOSEPH L. MOSSEY.
BY
Sheldon F. Raizes
ATTORNEY.

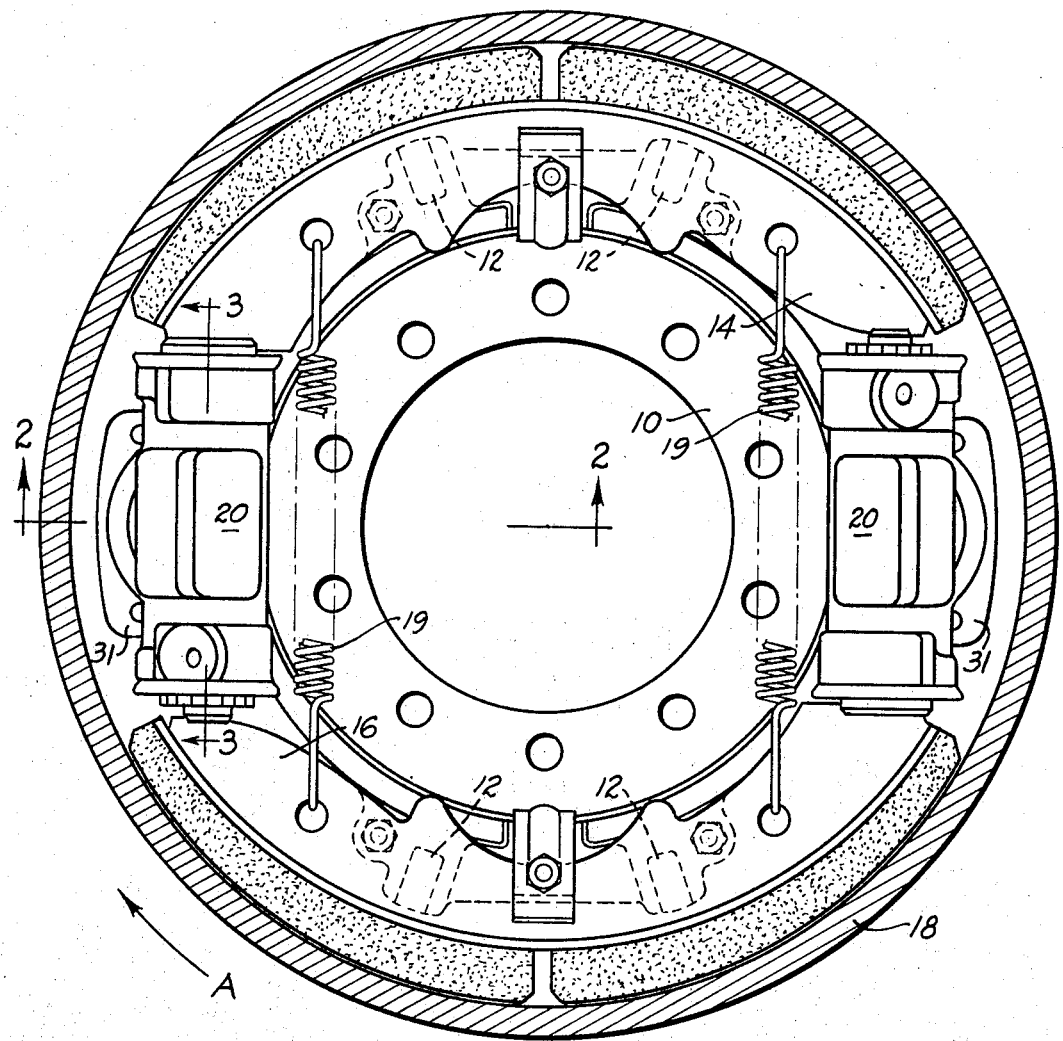
FIG_1

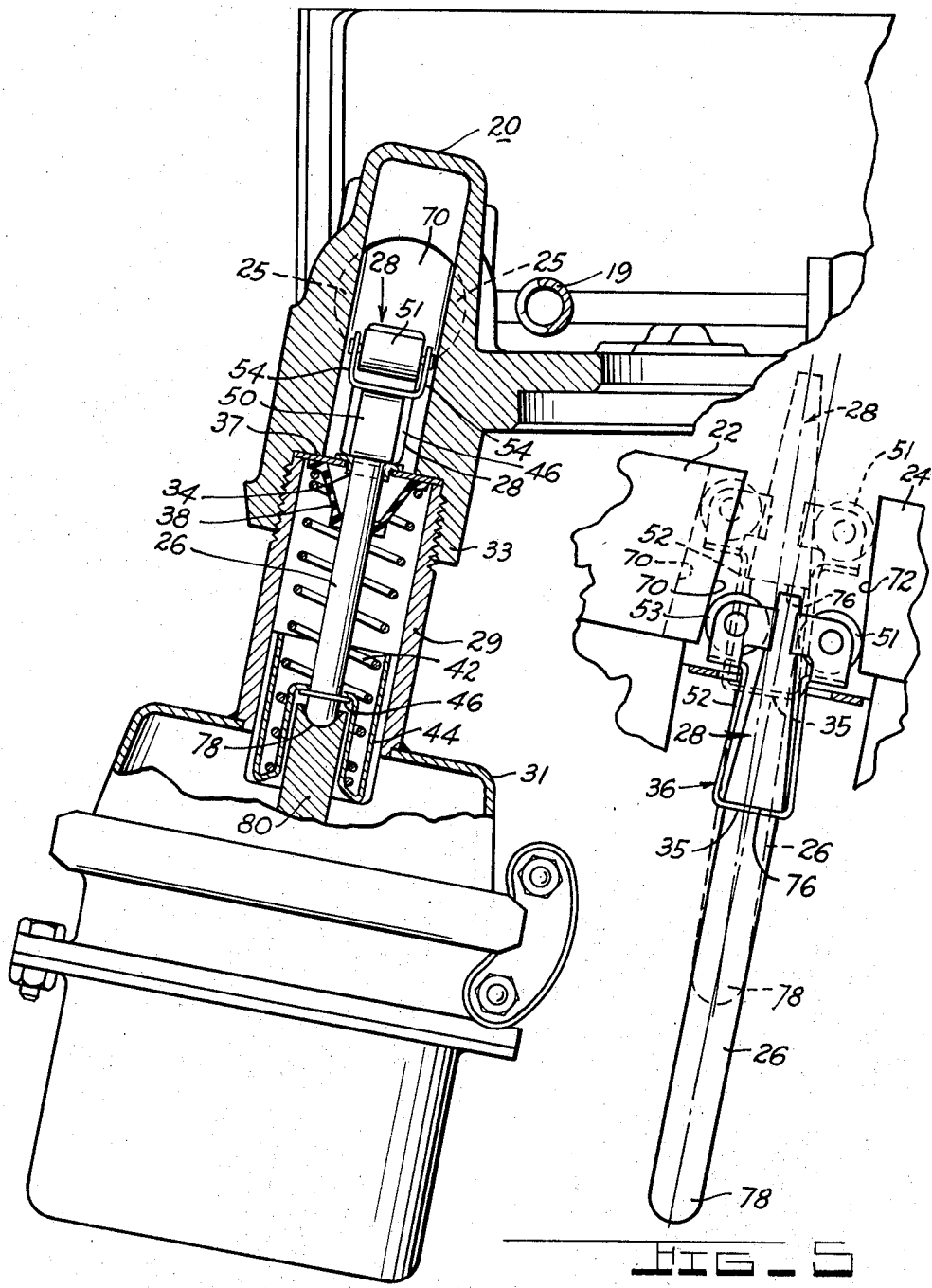

United States Patent Office 3,362,506
Patented Jan. 9, 1968

3,362,506
BRAKE
Joseph L. Mossey, South Bend, Ind., assignor to The Bendix Corporation, South Bend, Ind., a corporation of Delaware
Filed Jan. 10, 1964, Ser. No. 337,068
18 Claims. (Cl. 188—78)

This invention relates to a wedge actuated brake mechanism.

An object of this invention is to provide a brake with a wedge actuator assembly which is efficient and gives preferred braking characteristics during brake application.

Another object of the invention is to provide a wedge actuated brake assembly with an actuator assembly which includes antifriction means located between the wedge and adjacent ends of a pair of brake shoes of the brake assembly to provide for efficient translation of force input on the wedge to the adjacent ends of the brake shoes.

A further object of the invention is to provide a guide member for the anti-friction means which urges the anti-friction means engaging one cam surface of the wedge member into substantial lateral alignment, relative to the axis of the wedge, with the anti-friction means engaging the other cam surface of the wedge member.

Still another object of the invention is to provide a guide for the anti-friction means wherein the guide maintains substantial lateral alignment relative to the axis of the wedge, between the anti-friction means engaging each cam surface on the wedge and yet allows a slight misalignment therebetween during brake application.

Still a further object of the invention is to provide a guide member for the anti-friction means which not only maintains substantial alignment between the anti-friction means engaging one cam surface of the wedge member with the anti-friction means engaging the other cam surface of the wedge member but also urges the anti-friction means into contact with the cam surfaces.

Other objects of the invention will become apparent from the following description with reference to the drawings wherein:

FIGURE 1 is an elevational view of a brake assembly;
FIGURE 2 is a view taken along section line 2—2 of FIGURE 1;
FIGURE 3 is a view taken along section line 3—3 of FIGURE 1;
FIGURE 4 is a view taken along section line 4—4 of FIGURE 3; and
FIGURE 5 is a partial view of FIGURE 3 illustrating a brake applying position of the wedge and anti-friction means.

Referring to FIGURE 1, a spider 10 is adapted to be secured to a fixed part of a vehicle, such as an axle flange (not shown), and has diametrically opposed ledges 12 integral therewith for slidably supporting a pair of brake shoes 14 and 16. Each brake shoe has a pair of friction linings thereon for engaging a rotatable brake drum 18. Disposed between each pair of adjacent ends of the brake shoes are housings 20 each of which have a pair of plungers 22, 24 slidably mounted therein for movement in a plane transverse to the axis of the brake for spreading the shoes 14 and 16 into engagement with the drum 18. A pair of shoe retraction springs 19 are connected to each shoe for retracting the same to their released position which is defined by engagement of the plungers 22, 24 with surfaces 21 and 23, respectively, of an anchor 25 projecting from and integral with the inner wall of the housing 20.

A wedge member comprises a push rod 26 having a wedge shaped actuating end 28 located between the plungers 22 and 24 and is guided for reciprocal longitudinal movement in the neck 29 of a pneumatic actuator housing 31 and in the tubular portion 33 of the housing 20. The pneumatic actuator housing 31 is mounted to the housing 20 by a threaded connection between the neck 29 and the tubular portion 33 of the housing 20. The push rod 26 extends through an opening 34 in the base portion 35 of a U-shaped guide member 36 and also through openings in a washer 37, a rubber boot 38, an annular plate 40 engaging a flange 41 of the boot 38, a spring retainer 44, and also extends through a coil spring 42. A snap ring 46 is secured to the rod 26 for holding the spring retainer on the rod. The washer 37 engages a shoulder in the tubular portion 33 of the housing 20 and is retained thereagainst by the neck 29 of the pneumatic actuator housing 31. The coil spring 42 is compressed between the washer 37 and the spring retainer 44 to urge the wedged end of the push rod 26 in a brake release direction and also serves to hold the rubber boot 38 against the washer 37 to prevent contaminants from entering into the area beyond the washer from the pneumatic actuator.

The wedged end 28 has a pair of cam surfaces 46 and 48 thereon and the resilient guide member 36 has a pair of legs 50 and 52 located opposite of and urged in a direction toward the cam surfaces 46 and 48, respectively. A pair of spaced apart flanges 54 are located at the free end of the leg 50 and a pair of spaced apart flanges 56 are located at the free end of the leg 52 for receiving therebetween a respective one of rollers 51 and 53. The roller 51 is connected to each flange 54 by a pair of trunnions 58 extending therefrom through a respective opening 60 in each flange 54 and the roller 53 is connected to each flange 56 by a pair of trunnions 62 extending therefrom through a respective opening 64 of the flanges 56. The rollers 51 and 53 are maintained in substantial lateral alignment relative to the axis of the wedge by the legs 50 and 52 and are biased by their respective legs 50 and 52 into engagement with the cam surfaces 46 and 48. Grooves 66 and 68 are provided on the end surfaces of the plungers 22 and 24, respectively, and have inclined surfaces 70 and 72 for engagment by the rollers 51 and 53, respectively. The wedged end 28 has a bottom surface 76 which engages the base 35 of the guide member upon its return to its released position to return the rollers 51 and 53 to their normally released position relative to the wedged end 28. The released position of the rollers 51 and 53 and the wedge member is determined by the engagement of the guide member 36 with the washer 37. Each flange 54 and 56 extends beyond their respective cam surfaces 46 and 48, respectively, to embrace the wedged end 28 of the push rod 26 for aligning and guiding the wedged end 28 with respect to the rollers.

The input end 78 of the push rod 26 rockably engages a stem 80 which is operatively connected to a diaphragm or piston (not shown) of the pneumatic actuator contained within the housing 31. Any well known pneumatic actuator may be used and does not form a part of this invention. The opening of the washer 37 is somewhat larger than the diameter of the push rod 26 to permit rocking of the push rod 26 relative to the washer 37 and the opening 34 at the base portion 35 of the guide 36 is slightly larger than the diameter of the rod 26, due to manufacturing tolerances, permitting slidable movement of the push rod 26 relative to the guide 36. Due to the resiliency of the legs 50 and 52 of the guide member 36 and the tolerance space between the opening 34 and the push rod 26, slight longitudinal movement of one leg 50 or 52 relative to the other is possible thereby permitting slight lateral misalignment relative to the axis of the wedge between the rollers 51 and 53 during brake application. According to tests conducted, this slight misalignment is very advantageous.

In operation, assuming rotation of the drum 18 in the direction of Arrow A, the stem 80 thrusts the push rod 26 upwards (with respect to FIGURES 2 and 3) in response to a brake application signal transmitted to the pneumatic actuator. The wedged end 28 spreads the rollers 51, 53 and thereby the plungers 22, 24 and thus forces the brake shoes into initial contact with the drum 18. The torque exerted by the drum 18 on the brake shoe 16 will force the plunger 24 into engagement with its anchoring surface 23 and the torque exerted on the brake shoe 14 by the drum 18 will result in the brake shoe 14 anchoring on the plunger (not shown) located in the opposite housing 20 (right hand housing, FIGURE 1). The wedge member continues to travel upwards relative to the guide 36 and the rollers 51, 53 roll up the inclined surfaces 70 and 72 of the plungers to displace the plunger 22 for maintaining the shoe 14 in contact with the drum 18. During brake application, the wedge member and the guide 36 rock as a unit about the input end 78 on the stem 80 and take the position as shown in phantom in FIGURE 5 upon completion of the brake applying stroke. Upon release of the brake, the shoe return springs 19 will retract the brake shoes 14 and 16 to their normally released position wherein the plungers 22 and 24 abut the anchor 25 and the return spring 42 will retract the wedge member and the guide 36 to their normally released positions.

From the above, it can be readily seen that applicant's roller guide provides: (a) translation of wedge movement to the plungers through a substantially friction free roller assembly; (b) substantial lateral alignment of the rollers relative to the axis of the wedge while still providing for slight misalignment during brake application; (c) guiding of the wedge; and (d) orientation of the wedge relative to the rollers.

It should also be noted that the wedge member, the guide 36, the rollers 51 and 53, the washer 37, the boot 38, the flat plate 40, the coil spring 42, and the spring retainer 44 may be inserted into or withdrawn from the brake assembly as a unit providing for an easy assembly or disassembly operation.

For simplicity, the plungers 22 and 24 are shown as solid, but could include adjustable means for adjusting the released position of the brake shoes as the lining thereon wears.

Although this invention has been described in connection with a specific embodiment, the principles are susceptible to numerous other applications that will readily occur to persons skilled in the art.

I claim:

1. In a brake or the like: a support, a pair of brake shoes slidably mounted in end to end relationship on said support, an actuating member located between a pair of adjacent ends of said shoes having a pair of opposed cam faces, means for displacing said actuating member in a longitudinal direction, anti-friction means disposed between each of said adjacent ends of said shoes and a respective one of said cam faces, a guide mounted on said actuating member for longitudinal movement relative to and with said actuating member, said guide comprising a pair of resilient legs biased in a direction toward a respective one of said cam surfaces, means securing said anti-friction means to a respective one of said legs for longitudinal and lateral movement with said legs, said legs biasing said anti-friction means into engagement with said cam faces, said anti-friction means being operatively connected to each of said adjacent ends of said shoes whereby upon displacement of said actuating member relative to said guide, said legs and anti-friction means will be displaced laterally to actuate said brake shoes.

2. The structure as recited in claim 1 wherein a pair of plungers are slidably mounted on said support for movement in a plane generally transverse to the axis of said brake, each of said plungers being located between a respective one of said adjacent shoe ends and a respective one of said cam faces, one end of each of said plungers engaging a respective one of said anti-friction means and the other end of each of said plungers being operatively connected to its respective one of said adjacent brake shoe ends for actuating the same.

3. The structure as recited in claim 1 wherein said guide is U-shaped, an opening is located in the base portion of said guide connecting said legs, said anti-friction means are attached to the free end of each leg, said actuating member is a rod, wedge shaped at one end defining said cam surfaces and said rod extends through said opening of said guide.

4. The structure as recited in claim 3 wherein said anti-friction means are rollers.

5. The structure as recited in claim 4 wherein each leg has a pair of spaced flanges thereon embracing its respective roller and said wedged end, an opening in each of said flanges, a trunnion extending from each end of said roller into said opening of said flanges.

6. The structure as recited in claim 5 wherein a pair of plungers are slidably mounted on said support for movement in a plane generally transverse to the axis of said brake, each of said plungers being located between a respective one of said adjacent shoe ends and a respective one of said cam faces, one end of each of said plungers engaging a respective one of said anti-friction means and the other end of each of said plungers being operatively connected to its respective one of said adjacent brake shoe ends for actuating the same.

7. An actuator assembly comprising: an actuating member having at least one cam face thereon, a guide mounted on said actuating member for longitudinal movement relative to and with said actuating member, said guide having a resilient leg biased in a direction toward said one cam face, anti-friction means secured to said leg for longitudinal and lateral movement therewith, said leg biasing said anti-friction means into engagement with said one cam face.

8. The structure as recited in claim 7 wherein said anti-friction means is a roller.

9. The structure as recited in claim 8 wherein said leg has a pair of spaced flanges thereon embracing said roller and said cam surface, an opening in each of said flanges, a trunnion extending from each end of said roller into said flanges.

10. An actuator assembly comprising: an actuating member having a pair of cam faces thereon, a guide mounted on said actuating member for longitudinal movement relative to and with said actuating member, said guide having a pair of resilient legs each biased in a direction toward a respective one of said cam faces, anti-friction means secured to each of said legs for longitudinal and lateral movement therewith, each of said legs biasing its respective anti-friction means into engagement with a respective one of said cam faces.

11. The structure as recited in claim 10 wherein said guide is U-shaped, an opening is located in the base portion of said guide connecting said legs, said anti-friction means are attached to the free end of each leg, said actuating member is a rod, wedge shaped at one end defining said cam surfaces, and said rod extends through said opening of said guide.

12. The structure as recited in claim 11 wherein said anti-friction means are rollers.

13. The structure as recited in claim 12 wherein each leg has a pair of spaced flanges thereon embracing its respective roller and said wedged end, an opening in each of said flanges, a trunnion extending from each end of said roller into said opening in said flanges.

14. An actuator assembly comprising: an actuating member comprising a rod having an input end and a wedge at the other end thereof defining oppositely inclined cam faces, a U-shaped guide having a pair of resilient legs located opposite of and biased toward a respective one of said cam surfaces, an opening in the base portion of said guide, a pair of rollers each of which is secured to the free end of a respective one of said legs for longitudinal and lateral movement therewith, each of said legs biasing its respective roller into engagement with a respective one of said cam faces, said wedge having an end surface facing said input end of said rod, one face of said base portion of said guide abutting said end surface of said wedge, an annular washer mounted on said rod having one face abutting the other face of said base portion of said guide, a boot mounted on said rod and having a flanged end engaging the other face of said washer, a spring retainer slidably mounted on said rod, a groove in said rod, a snap ring received in said groove and retaining said spring retainer on said rod, a coil spring surrounding said rod and located between and operatively connected to said flanged end of said boot and said spring retainer for urging the base portion of said guide and the bottom of said wedge into engagement with each other.

15. An assembly for a wedge actuated type friction device comprising a resilient body member having substantially coextensive and laterally opposed arms, free end portions on said arms, said arms and end portions being laterally movable relative to each other in a substantially common operating plane, and anti-friction means mounted about a fixed axis on said arms adjacent to said free end portions.

16. An assembly for a wedge actuated type friction device comprising a pair of laterally opposed arm portions interconnected by a resilient portion having a substantially U-shaped configuration, said arm portions being displaceable relative to each other in substantially the same operating plane to stress said resilient portion, and anti-friction means rotatably mounted about a fixed axis on each of said arm portions for concerted lateral displacement therewith and having bearing surfaces extending beyond said arm portions in the direction of the operating plane, respectively.

17. A subassembly for a wedge actuated type friction device comprising an axially displaceable wedge for releasable connection with a fluid pressure responsive actuating motor, a cage and roller assembly mounted in floating engagement with said wedge including a body integrally formed of relatively thin strip material having a pair of arm portions substantially parallel to the opposed inclined sides of said wedge, roller means rotatably mounted about a fixed axis on each of said arm portions and in bearing engagement with the opposed inclined sides of said wedge, and a resilient portion interconnecting said arm portions adjacent to one end of said wedge to provide concerted displacement of said arm portions and roller means in a direction substantialy normal to the axis of said wedge upon axial movement of said wedge.

18. In a brake assembly adapted for coaction with a surrounding relatively rotatable drum, support means, at least two friction members mounted on said support means for outward displacement into frictional engagement with said drum, actuator means on said support means disposed between said friction members including opposed plungers movable therein and having their outer ends operatively connected with said friction members, a wedge member reciprocally movable substantially along its own axis between the adjacent inner ends of said plungers and having opposed inclined surfaces respectively adjacent to the inner ends of said plungers, and a unitary cage assembly movably mounted in said actuator means independently of said wedge member and plunger for translating axial movement of said wedge member in one direction into displacement movement of said plungers to effect the frictional engagement of said friction members with said drum including opposed arm portions extending substantially in planes intermediate said opposed wedge member surfaces and the inner ends of said plungers, respectively, roller means rotatably mounted about a fixed axis on said arm portions and in bearing engagement between said opposed wedge member surfaces and the inner ends of said plungers, and a resilient portion interconnecting said arm portions, said resilient portion being yieldable to provide displacement movement of said arm portions and rollers means in a plane substantially normal to the axis of said wedge member to displace said plungers and move said friction members into frictional engagement with said drum upon the axial movement of said wedge member in the one direction, and a fluid pressure responsive motor releasably engaged with said support means and said wedge member for driving said wedge member in the one direction.

References Cited
UNITED STATES PATENTS

| | | | |
|---|---|---|---|
| 1,968,667 | 7/1934 | White | 188—152.85 |
| 3,037,584 | 6/1962 | Cox et al. | 188—78 |
| 3,139,762 | 7/1964 | Alfieri | 74—110 |

MILTON KAUFMAN, *Primary Examiner.*

BROUGHTON C. DURHAM, FRED C. MATTERN,
*Examiners.*

F. E. BAKER, *Assistant Examiner.*